3,721,636
FREEZE-THAW STABLE HIGH SOLIDS LATEXES OF INTERPOLYMERS OF VINYL CHLORIDE, ETHYLENE AND CERTAIN CARBOXYL-CONTAINING MONOMERS

Samuel J. Makower, 1492 Wistar Drive, Wyncote, Pa. 19005; Philip A. Cautilli, 2012 Shadybrook Lane, Feasterville, Pa. 19047; and Jack Dickstein, 318 Keats Road, Huntingdon Valley, Pa. 19006
No Drawing. Filed Nov. 12, 1970, Ser. No. 88,975
Int. Cl. C08f 29/24
U.S. Cl. 260—29.6 RW                      10 Claims

ABSTRACT OF THE DISCLOSURE

This invention relates to freeze-thaw stable latexes of vinyl chloride interpolymers whose composition by weight includes between about 6 and 30% ethylene and between about 0.5 and 10% of a coreactive carboxylated monomer selected from the group consisting of acrylic acid, methacrylic acid, crotonic acid and the monoesters of maleic, fumaric, itaconic and aconitic acids with alcohols having from one to ten carbon atoms. The latexes have particular utility as adhesives for the durable bonding of polymeric films such as polyvinyl chloride to aluminum, iron and other metals, such as in structural siding. The method of making the latexes comprises maintaining under ethylene pressure an aqueous composition containing a seed latex and a free-radical initiating system and having a pH not greater than 5, and gradually adding thereto the monomers to be interpolymerized over a period of at least six hours. The method can be used to make stable latexes containing as high as about 55% solids.

BACKGROUND OF THE INVENTION

Latexes of vinyl chloride/ethylene (CV1/E) interpolymers are useful as film-forming components of adhesives and of various coating compositions such as paints and finishes for paper, textiles and the like. VC1/E interpolymers containing between 6% and 30% of ethylene are particularly suitable.

The VC1/E latexes of the prior art are known to be deficient in their ability to withstand exposure to freezing temperatures. When such latexes are frozen and then thawed they coagulate, lose their film-forming characteristics and are no longer compatible with the materials commonly used in adhesive and coating formulations.

The present inventors conceived the idea that copolymerization of small amounts of carboxylated comonomers along with the vinyl chloride and ethylene might introduce freeze-thaw resistant properties into the interpolymer. A search of the literature indicated that attempts to incorporate such monomers into VC1/E had not been successful. It is stated, for example, in French Pat. 1,530,503 that efforts to incorporate acrylic acid, methacrylic acid or their salts with ammonium or alkali metals in vinyl chloride/ethylene copolymers all failed. It is furthermore stated therein that acrylic acid not only does not copolymerize but also inhibits the reaction between vinyl chloride and ethylene.

SUMMARY OF THE INVENTION

A method has now been found for preparing stable latexes of vinyl chloride/ethylene interpolymers whose composition by weight includes between about 0.5 and 10% of a coreactive carboxylated monomer. The coreactive carboxylic monomers of this invention are selected singly or in combination from the group consisting of acrylic acid, methacrylic acid, crotonic acid and the monoesters of maleic, fumaric, itaconic and aconitic acids with alcohols having from one to ten carbon atoms. The method is surprisingly capable of making latexes with as high as 55% solids content which are stable to repeated cycles of freezing and thawing.

The method of this invention is particularly effective in making latexes of interpolymers containing between about 93.5% and 60% of vinyl chloride interpolymerized with between about 6% and 30% of ethylene and about 0.5% to 10% of said carboxylated monomer, all these percentages being based on the weight of total interpolymer.

The latexes of this invention are particularly useful as adhesives for the durable bonding of vinyl (polyvinyl chloride) film to metallic substrates such as aluminum or iron. The bonds are weather-resistant in products such as aluminum siding for houses.

Briefly stated, the method of this invention comprises maintaining under ethylene pressure an aqueous composition containing a seed latex and a free-radical initiating system and having a pH between about 0.5 and 5.0, and gradually adding thereto, over a period of at least six hours, a comonomer charge including vinyl chloride and a minor amount of a coreactive carboxylated comonomer selected from the group consisting of acrylic acid, methacrylic acid, crotonic acid and the monoesters of maleic, fumaric, itaconic and aconitic acids with alcohols having from one to ten carbon atoms.

The interpolymer compositions made by the method of this invention are new. This invention therefore includes also the novel latexes. The latexes can be prepared by polymerization to solids content over the entire range up to about 55%. If desired, a more concentrated latex can be diluted with water to make a less concentrated latex without loss of mechanical stability or of stability to freezing and thawing. Illustratively, a latex having solids between about 45 to 55% can be diluted with sufficient water to reduce the solids to about 30%. The latexes are specially useful at concentrations in the range of about 30 to 55% solids, by weight. More particularly, latexes with solids content in the range of about 42% to 55% are suitable.

In using the latexes of this invention to bond vinyl film to metallic substrates such as aluminum or iron, it has been found advantages to add to the latex sufficient volatile base such as ammonia or substituted amines including methylamine, dimethylamine, trimethylamine, ethylamine, diethylamine, triethylamine, ethanolamine, diethanolamine or triethanolamine to raise the pH of the latex to between about 5 and 8, more particularly to between about 6 and 8. The adhesive strength of the bond obtained at such higher pH is substantially greater than when the pH is left at the 0.5 to 5.0 range of the polymerization stage. Latexes used for this purpose can be neutralized any time after polymerization is completed. The good mechanical and freeze-thaw stability of the latex is not impaired by said addition of volatile base.

DETAILED DESCRIPTION

In the method of this invention, ethylene is maintained at superatmospheric pressure over an aqueous composition in which free-radical initiated copolymerization takes place during gradual addition of the other monomers reacting with the ethylene. These comonomers contain a major proportion of vinyl chloride and a minor proportion of acrylic acid and/or other coreactive carboxylated comonomer. Optical inclusion of supplemental comonomers is described further below. The preferred interpolymer compositions contain about 6 to 30% ethylene, about 0.5 to 10% carboxylated comonomer and about 60 to 93.5% vinyl chloride; the invention will be illustrated chiefly with the production of such interpolymers.

The success of the present method depends upon two factors or conditions, namely (1) the presence of a seed latex in the aqueous composition and (2) the maintenance of pH in the aqueous composition at a level within the range of about 0.5–5.0. When either of these conditions has been omitted, we have not found it possible to copolymerize the carboxylated comonomer of this invention with the ethylene and vinyl chloride in the form of stable latexes.

THE SEED LATEX

The seed latex used in this invention can have an average particle size between about 0.005 and 0.10 microns, particle sizes between about 0.1 and 0.05 microns being particularly suitable.

The seed latex can be prepared by the emulsion polymerization of any thus polymerizable ethylenically unsaturated compound or compounds, as described below. Polymerization of the seed monomers is effected by a free-radical initiating system. Any of the known methods can be used to obtain a stable dispersion and to control the particle size.

Thus, any emulsion stabilizer can be used which is capable of maintaining a latex dispersed in the form of latex particles and preventing said particles from coagulating under mechanical stress developed during the stirring of the latex. Anionic or nonionic surfactants are the preferred emulsion stabilizers and will be used herein to illustrate the invention. The emulsion stabilizer can also comprise a polymeric colloid stabilizer of the type often identified as a "colloid protective agent."

The surfactant used in preparation of the seed latex can be selected from any of the anionic and non-ionic surfactants. For example, any of such surfactants customarily used in effecting emulsion polymerization can be used, including sodium lauryl sulfate, sodium dodecyl benzene sulfonate, sodium alkylsulfosuccinates, alkyl esters of sodium sulfosuccinate, sodium or ammonium salts of sulfate esters of alkyl phenoxy poly (ethylenoxy) ethanols such as octyl or nonyl phenoxy poly (ethylenoxy) ethanols, including the full range of ethylene oxide contents available. The aqueous composition can also contain condensates of ethylene oxide with hydrophobic bases formed by condensing propylene oxide with propylene glycol.

As will be evident to those trained in the art of emulsion polymerization, various other types of surface active agents can be applied and also certain surfactants can be used in combination to obtain a particular balance of properties. Surfactants can be introduced into the aqueous composition of the seed latex before, during or after the polymerization of the seed latex.

As to amounts, surfactants used in preparation of the seed latex can be in the usual proportions well established in the art of emulsion polymerization, as from 0.04% to about 5% based on total weight of seed-latex monomers. Ordinarily, amounts between about 0.5% and 2.0% based on seed-latex monomers are preferred.

When the seed latex contains a polymeric colloid stabilizer this can be starch, gelatin, casein, hydroxyethyl cellulose, carboxymethyl cellulose, polyvinyl alcohol of both fully hydrolyzed and partialy hydrolyzed grades, polyvinyl pyrrolidone and the like. The colloid stabilizer can be used in amount up to about 10% of the seed-latex monomers, between about 1% and 5% being particularly suitable.

The polymer of the seed latex can be a homopolymer or interpolymer whose monomer composition can be selected singly or in combination from the emulsion polymerizable ethylenically unsaturated aliphatic compounds including alpha-olefins, vinyl or vinylidene halides, vinyl esters and alkyl esters of acrylic and methacrylic acids respectively with alcohols having from 1 to 10 carbon atoms. An alpha-olefin can have from 2 to 6 carbon atoms, thus it can be ethylene, propylene, butene-1 or hexene-1. A vinyl halide can be vinyl chloride or vinyl bromide. A vinylidene halide can be vinylidene chloride. A vinyl ester can be derived from any carboxylic acid with one to form carbon atoms, thus it can be vinyl formate, vinyl acetate, vinyl propionate or vinyl butyrate. Acrylic and methacrylic esters can be selected from the esters of acrylic and methacrylic acids respectively with any straight chain branched or cyclic alcohol having from one to ten carbon atoms, as for example methyl alcohol, ethyl alcohol, n-propyl alcohol, isopropyl alcohol, n-butyl alcohol, isobutyl alcohol, secondary butyl alcohol, tertiary butyl alcohol, n-amyl alcohol, isoamyl alcohol, tertiary amyl alcohol, n-hexyl alcohol, cycohexanol, n-octyl alcohol, capryl alcohol, and n-decyl alcohol. Thus exemplarily, an alkyl acrylate can be methyl acrylate, isopropyl acrylate, ethyl acrylate, 2-ethylhexyl acrylate, butyl acrylate, isobutylacrylate or decyl acrylate; an alkyl methacrylate can be methyl methacrylate, ethyl methacrylate, propyl methacrylate, isopropyl methacrylate, butyl methacrylate, isobutyl methacrylate, 2-ethylhexyl methacrylate or decyl methacrylate. Illustratively, the polymer of the seed latex can be polyethylene, polyvinyl chloride, polyvinyl acetate, poly (methyl methacrylate), poly (ethyl acrylate), poly (2-ethyl hexy acrylate), a copolymer of methyl acrylate and vinyl acetate, a copolymer of vinyl chloride and a minor amount of ethylene or a copolymer of vinyl chloride with 99 to 1% of one of the said ethylenically unsaturated compounds. Preferred seed latexes are polyvinyl chloride, polyvinyl acetate and poly (2-ethylhexyl acrylate).

The seed latex can be prepared beforehand in a separate vessel and a desired aliquot can then be introduced into the aqueous composition of this invention. Alternatively, the seed latex can be made in situ in all or part of said aqueous composition, before proceeding with the remaining steps of the method of this invention.

Control of pH

To achieve the novel results of this invention a factor equally important to the use of a seed latex is the maintenance of the pH of the aqueous composition at between about 0.5 to 5.0 throughout the interpolymerization reaction. For best results in smoothness of interpolymerization it is preferred to keep the pH within the range of about 1 to 3.5. In general this is achievable by suitable preparation of seed latex combined with the acidity of the gradually added carboxylated monomer. However, when the pH of the aqueous composition is outside of the desired range, it can be adjusted by the addition of appropriate amounts of acid or base. Inorganic acids like phosphoric acid, sulfuric acid, hydrochloric acid or organic acids like formic, acetic and propionic acid can, for example, be used. Illustrative of bases there can be mentioned potassium hydroxide, sodium hydroxide, ammonia, methylamine, diethanolamine, triethanolamine, trimethylamine, sodium carbonate, sodium bicarbonate, trisodium phosphate, sodium dihydrogen phosphate, disodium hydrogen phosphate, potassium tartrate and the like.

VCl/E interpolymerization procedure

Thus the VCl/E interpolymerization procedure of this invention is carried out in an aqueous composition which contains a seed latex such as described above and which is maintained at a pH of between about 0.5 and 5.0.

As to the amount of seed latex, sufficient is used so that the weight proportion of seed latex solids to total solids of the finished product will be in the range between about 0.01% and 10%, preferably in the range between about 0.5% and 3%. The exact correspondence between the ratio of seed solids respectively to initial aqueous composition and to finished total solids will, of course, depend in any particular case on the extent of the interpolymerization. However, in general, the amount of seed latex contained initially by the aqueous composition can be such that the seed solids are between about 0.01% and 10% by weight of said aqueous composition. The preferred range of seed solids is between about 0.5% and 3% of the weight of the initial aqueous composition.

If desired, the aqueous composition can contain also additional amounts of emulsion stabilizer selected from the same types of such materials as mentioned above in describing the seed latex. However, in the interest of attaining water-resistant films, it is desirable to employ a minimum of surfactant. It is therefore preferred to use amounts of seed solids and surfactant such that the total amount of surfactant in the aqueous composition does not exceed about 0.4% of the weight of comonomers added (charged) to said composition while carrying out the interpolymerization with ethylene. It has surprisingly been found that freeze-thaw stable latexes can be made by the method of this invention with total surfactant less than 0.1% of the weight of said charged comonomers. This has a unique advantage in the preparation of coatings and adhesives possessing high resistance to water.

The VCl/E interpolymerization of this invention can be carried out at any suitable ethylene pressure in the range from about 50 p.s.i. to about 15,000 p.s.i. and at temperatures in the range from 15° C. to about 85° C. Choice of conditions will depend chiefly upon the amount of ethylene which is desired in the interpolymer and upon the nature of the initiating system employed. Thus, the use of redox initiating systems commonly require temperatures below about 50° C. and pressures above 3,000 p.s.i. The use of thermally-activated initiators permits the use of temperatures above 50° C. The present inventors have found that when a thermally-activated initiator is used, temperatures between 50° C. and 85° C. and pressures between about 500 and 3,000 p.s.i. are suitable for the purpose of introducing from about 6% to 30% ethylene into the vinyl chloride interpolymer.

A condition in the method of this invention is that the addition of the comonomers is extended over a period of at least six hours. All of the monomers to be interpolymerized with ethylene can be added over such a period, i.e., the entire amount of both the comonomers comprising vinyl chloride (charge (A)) and the carboxylated comonomer (charge (B)) can be added continuously or incrementally over the same period of time. Alternatively, before commencing addition of charge (B), an initial portion of charge (A) can be added in an amount corresponding to between about 1% and 25% of the weight of the emulsifying composition. The remainder of charge (A) is then added over the stated period gradually and simultaneously with the carboxylated monomer charge (B). If the comonomers are added at too rapid a rate, there is a tendency for the ratio of ethylene incorporated in the copolymer to be diminished. On the other hand, prolonged addition times are impractical. It is preferred to limit the comonomer addition time to between about 10 and 18 hours, more preferably between about 12 and 16 hours. It is also preferred to maintain the ethylene pressure and temperature substantially constant during the period of adding the comonomers so as to ensure a substantially constant ethylene content in the polymer formed at successive stages of the run.

Free-radical donating initiators are used both in preparation of the seed latex added to the aqueous composition of this invention and also in the preparation of the product latex of this invention. Such initiators can be selected from any of the initiators for aqueous emulsion polymerization known in the art including those which undergo scission under the influence of heat and those which are caused to from free-radicals by reaction with reducing agents. Water-soluble type initiators are usually to be preferred including potassium persulfate, sodium persulfate, ammonium persulfate, potassium peroxydiphosphate, hydrogen peroxide, and others which will be known to those skilled in the art. When reducing agents are used it is again preferred to use materials which are water-soluble such as sodium formaldehyde sulfoxylate, sodium metabisulfite, and ascorbic acid.

The initiator, and the redox agent if used, can be supplied to the aqueous composition in various way. For example, the entire amount of initiator used can be added at the start of reaction, or an initial portion can be followed by gradual or portionwise addition of the remainder during the course of reaction, or the entire amount can be added gradually as an aqueous solution throughout the reaction period. The amounts to be used will depend upon the rate of polymerization desired. Preferably, the aqueous composition contains between about 0.1% and 5% of initiator. If a reducing agent is used, it also is used in amount totaling between about 0.1% and 5%.

The amount of carboxylated monomer copolymerizable with the main monomers of this invention can be selected in the range of between about 0.5% and 10% based on the total weight of interpolymer. While higher percentages in this range have certain advantages in increasing the adhesion of the interpolymer to metal substrates and as a source of self-thickenability on addition of alkalies, the property of freeze-thaw resistance is obtained at lower levels, a particularly suitable range being between about 0.5% and 4% of carboxylated monomer based on total weight of interpolymer.

A carboxylated monomer suitable for use in the present invention can be selected from the group consisting of acrylic acid, methacrylic acid, crotonic acid and the monoesters of maleic, fumaric, itaconic and aconitic acids with alcohols having from 1 to 10 carbon atoms. Acrylic acid is the preferred carboxylated monomer. As to the monoesters these may be esters of any straight chain, branched or cyclic alcohol with the stated number of carbon atoms, as for example methyl alcohol, ethyl alcohol, n-propyl alcohol, isopropyl alcohol, n-butyl alcohol, isobutyl alcohol, secondary butyl alcohol, tertiary butyl alcohol, n-amyl alcohol, isoamyl alcohol, tertiary amyl alcohol, n-hexyl alcohol, cyclohexanol, n-octyl alcohol, capryl alcohol, and n-decyl alcohol. Thus, exemplarily, the carboxylated monomer can be monomethyl itaconate, monoethyl maleate, mono isobutyl fumarate, monocyclohexyl maleate, monomethyl aconitate, monoteritary butyl itaconate, monocapryl aconitate, monodecyl fumarate or mono-octyl maleate. Any of these carboxylated monomers can be used singly or in combination in the method of this invention.

Although maleic acid, fumaric acid and itaconic acids are often considered as performing in a manner equivalent to that of acrylic acid and other carboxylated monomers, they surprisingly do not work in the method of this invention. When pH is controlled according to the instant method and a seed latex is used such as works with the other stated carboxylated monomers, maleic acid, fumaric acid and itaconic acid are not copolymerized and polymerization of vinyl chloride with ethylene is inhibited.

The ratio of the added amounts of comonomers will depend on the desired interpolymer composition. Thus, for example, if the interpolymer is to contain about 82.5%–76% vinyl chloride, 17%–20% ethylene and 0.5%–4% acrylic acid (with the pressure, say, at 1200–1500 p.s.i. and the temperature between 55 and 70° C.,) the vinyl chloride and acrylic acid can be added in the weight ratio of between about 100/0.6 and 100/5.3.

In the gradual addition of the comonomers to the ethylene-pressurized aqueous composition, it is convenient to add between 5 and 20% in excess of the amount needed to form a latex with the desired solids content. The interpolymerization is termined at the point where the desired solids is reached and the unreacted comonomer can then be recovered by evaporation, or in the case of minor amounts of carboxylated monomer, can remain as an acidifying component of the aqueous phase.

The method of this invention is illustrated chiefly as a means of introducing small amounts of the carboxylated comonomer such as acrylic acid into interpolymers having vinyl chloride and ethylene as sole other monomers. However, the method is also effective when the comonomer (referred to above as charge (A)) comprises at least 51%, by weight, of vinyl chloride and when up to 49% of the comonomer charge (A) is supplemental olefinically unsaturated aliphatic coreactive monomers selected singly or in combination from the same group of monomers described above as applicable in making seed polymer. Suitably, the comonomer charge (A) can have a weight composition of about 75 to 85% vinyl chloride and about 25 to 15% of supplemental monomer. A particularly suitable supplemental monomer is vinyl acetate. Other specially appropriate comonomers include vinyl propionate, vinylidene chloride, propylene butene and esters of acrylic and methacrylic acid with alcohols containing up to ten carbon atoms in the alkyl group. Illustratively, when a comonomer charge (A) has the weight composition of 20 parts vinyl acetate and 80 parts vinyl chloride and the carboxylated comonomer is acrylic acid. The resultant composition of the product of this invention can be about 6–30% ethylene, 0.5 to 10% acrylic acid, 74.8–48% vinyl chloride and 18.7–12% vinyl acetate.

In further illustration, when the pressure and temperature are controlled to introduce 17% by weight ethylene into the interpolymer and an acrylic acid level of 3% is desired, when vinyl chloride is the only other comonomer, the monomer charges would be in the weight ratio of 70 parts vinyl chloride to 3 parts acrylic acid. However, up to 49% of the 70 parts of vinyl chloride charge can be replaced by other monomers as for example vinyl acetate. The 70 parts of monomer mixture, added with the 3 parts of acrylic acid, can therefore, have a composition varying from 0 to 34.3 parts vinyl acetate, the corresponding vinyl chloride content of the monomer charge being from 70 to 35.7 parts.

It is, of course, to be understood that "interpolymer" as herein used refers to that part of the final latex solids which is formed by interpolymerizing ethylene with the carboxylated monomer, vinyl chloride and other supplemental coreactive monomers, and is exclusive of the seed latex solids also contained in the final latex solids.

Surfactants and initiator residues also constitute a finite part of the product latex solids, but their relative amounts are usually negligibly small in comparison to the magnitude of the interpolymer plus seed solids.

The method of this invention can be used to make stable latexes of high solids content. Products containing 55% solids have been found to be stable to mechanical shear and to repeated freezing and thawing cycles of exposure to temperatures ranging between −18° C. and +25° C. While capability of making latexes of high solids content is a decided advantage of the method, a latex of lower solids can, of course, be made either by early termination of the comonomer addition or early termination of the reaction or both.

In the use of the latexes of this invention, solids in the range of about 42 to 55% are generally most suitable. When a latex of lower solids, as for example 30% is desired, it can either be prepared directly at low solids by an early termination as above described, or a more concentrated latex can be diluted with water to the desired solids.

The latexes prepared by the method of this invention can be stored and used at the pH of manufacture, namely between about 0.5 and 5. However, the latexes can also be neutralized to a pH of between about 5 and 8 without impairing either mechanical or freeze-thaw stability. Any suitable base can be used for such neutralization purposes, such as the bases mentioned above as suitable for controlling pH during polymerization.

It has been found that neutralization of the latex of this invention with a volatile base such as ammonia, diethylamine or triethanolamine to a pH between about 6 and 8 is particularly advantageous when the latex is used as an adhesive on a metal substrate such as aluminum or iron. The adhesive strength bonding vinyl film, for example, to aluminum is substantially greater when the adhesive comprises a latex of this invention with pH between about 5 and 8, more particularly between about 6 and 8, than when the pH is substantially less than about 5.

This invention will be further illustrated by description in connection with the following specific examples of the practice of it wherein, as also elsewhere herein, proportions are in parts by weight unless stated otherwise, and wherein the values reported for the ethylene content of the resultant interpolymers were obtained by direct quantitative elemental analysis. Determination of the copolymerized carboxylated comonomers was made by vapor phase chromatography of the residual unreacted monomer. The symbol "p.s.i." as used herein signifies absolute pounds per square inch, sometimes designated as "p.s.i.a."

EXAMPLE 1

This example illustrates the preparation of a seed latex of polyvinyl chloride.

Using a pressure kettle equipped with stirrer and means for introducing reactants, 60.0 grams of sodium lauryl sulfate were dispersed in 11,550 grams of deionized water. There was then added 6060 grams of vinyl chloride monomer and 24.2 grams sodium persulfate. Polymerization was carried out at 40° C. to 60° C. accelerated by the gradual addition of 100 ml. of 5% aqueous sodium formaldehyde sulfoxylate. The resultant seed latex had a solids content of 34.6% and was post-stabilized by the addition of 60.6 grams of sodium lauryl sulfate. Average particles size of the seed latex was .035 micron. The pH was equal to 2.0.

EXAMPLE 2

This example illustrates the preparation of a seed latex of polyvinyl acetate.

Using a vessel equipped with stirrer, reflux condenser and means for introducing reactants, 6 parts by weight of sodium lauryl sulfate were dispersed in 95 parts of deionized water. There was then added 25 parts of vinyl acetate monomer, 0.40 part of potassium persulfate and 2.0 parts of a 2% aqueous solution of sodium bisulfite. After adjustment of pH to 5.0 with dilute sodium hydroxide, the aqueous composition was heated. When the temperature reached 55° C., 75 parts of vinyl acetate monomer and 18 parts of a 2% aqueous solution of sodium bisulfite were added gradually over a period of one hour, during which the temperature was about 62° C. After the additions were complete, the composition was heated to 72° C. and kept at 72° C. for an additional hour, yielding a seed latex having 45% solids with a particle size ranging between 0.02 and .05 microns.

EXAMPLE 3

This example illustrates the preparation of a seed latex of 2-ethylhexylacrylate.

Using a reactor as in Example 1, a 140 grams portion of a 25% aqueous solution of sodium lauryl sulfate was dispersed in 4,200 ml. of distilled water. There was then added a solution of 46.5 grams ammonium persulfate in 500 ml. water.

A monomer emulsion was prepared by dispersing 3,500 grams of 2-ethylhexylacrylate in a solution of 70 grams 25% aqueous sodium lauryl sulfate in 1,000 ml. of water.

The reactor composition was heated to 80° C. and held at that temperature while the monomer emulsion was added over a period of one hour. Tests on the latex obtained showed that conversion of monomer to polymer was substantially complete, the latex had a solids content equal to 37% and a surface tension of 56 dyne/cms. Particle size was between 0.03 and 0.06 micron. The pH was equal to 2.0.

EXAMPLE 4

An autoclave with stirrer was charged with 3,840 grams of distilled water, 160 grams of the seed latex of Example 3 and 1,200 grams of vinyl chloride monomer. The pH of this dispersion was 1.9.

The dispersion was heated to 60° C. and charged with ethylene until the pressure reached 1,200 p.s.i. While temperature was maintained at 60° C. and ethylene pressure at 1,200 p.s.i., 200 grams of a 3% aqueous solution of sodium persulfate was charged to the vessel. Three streams consisting of respectively 4,800 grams of vinyl chloride monomer, 900 grams of 3% aqueous sodium persulfate solution and 1,200 grams of 10% aqueous acrylic acid solution, were simultaneously fed to the autoclave over a 13 hour period. Polymerization was continued for an additional three hours at 60° C. The product was cooled to room temperature and the pressure was released. Solids content of the product latex was found to be 48.7%. The surface tension of the latex was 59.7 dynes/cm. and its pH was 1.65. Ethylene content of recovered polymer was 18% by weight. Copolymerized acrylic acid was 1.9%, vinyl chloride content was 80.1%.

An aliquot sample of the product latex was submitted to ten twelve-hour freeze-thaw cycles. The temperature in these tests ranged from −18° C. to +25° C. The latex was completely stable to the repeated freezing and thawing, there being no appreciable coagulum or sediment.

EXAMPLE 5

To an autoclave was charged 4,500 ml. of distilled water; 178 grams of a seed latex made by a procedure and composition substantially the same as in Example 3 and containing 33.7% solids; and 35 grams of sodium persulfate. The temperature was raised and ethylene gas was introduced to the reactor so as to have 500 p.s.i. ethylene pressure at 60° C. Two simultaneous gradual feeds to the reactor were begun and continued over a 16-hour period maintaining said temperature and pressure, Feed 1 consisting of 6000 grams of vinyl chloride monomer and Feed 2 of 1200 grams of a 5% aqueous solution of acrylic acid. The pH of the samples taken during the reaction was 2.0–1.5. After an additional three-hour hold period upon completion of the feeds, the reactor was cooled and subsequently vented to atmospheric pressure. A coagulum-free latex was obtained having 53.5% solids, 57 dynes/cm. surface tension and a pH of 1.5. Copolymerized ethylene was 7.0%, copolymerized acrylic acid was 0.9%.

A latex sample neutralized to pH 7.0 with ammonia was found to exhibit no instability after standing for six months.

Coatings of the neutralized latex on vinyl film and subsequent lamination to steel and aluminum produced laminates with exceptionally strong adhesive bonds.

When the procedure of this example was repeated except that the starting pH was 9.0, samples taken after 2, 4, and 8 hours and after completion of the feeds, all showed no reaction had occurred.

EXAMPLE 6

To an autoclave was charged 5000 ml. of distilled water; 153 grams of seed latex made by a procedure and composition substantially the same as in Example 3 and containing 39.4% solids; 35.0 grams of sodium persulfate and 1200 grams of vinyl chloride monomer. The temperature was raised and ethylene gas introduced to the reactor so as to have 1200 p.s.i. ethylene pressure at 63° C. Two simultaneous gradual feeds to the reactor were begun and continued over a 13-hour period maintaining said temperature and pressure. Feed 1 consisted of 4,100 grams of vinyl chloride monomer and Feed 2 of 2,395 grams of 25% solution of acrylic acid in water. After an additional 3 hour holding period upon completion of the feeds, the reactor was cooled and subsequently vented to atmospheric pressure. A coagulum-free latex was obtained having the following physical constants: 41.8% solids, 45 dynes/cm. surface tension, and a pH of 1.6. The composition of recovered interpolymer was found to be 74.1% vinyl chloride, 16% ethylene and 9.9% acrylic acid.

The resultant latex was found to exhibit self-thickening properties upon neutralization.

EXAMPLE 7

To an autoclave was charged 3,840 ml. of distilled water; 450 grams of seed latex made by a procedure and composition substantially as that of Example 3 and containing 39.4% solids; 6 grams of sodium persulfate, and 500 g. vinyl chloride monomer. The temperature was raised and ethylene gas was introduced to the reactor so as to have 1,200 p.s.i. ethylene pressure at 63° C. Two simultaneous gradual feeds to the reactor were begun and continued over a 16 hour period maintaining said temperature and pressure. Feed 1 was 5,588 grams of a mixture of vinyl chloride monomer and crotonic acid in a ratio of 97.1 to 2.9 VC to acid. Feed 2 was 1000 grams of a 3% solution of sodium persulfate in water. After an additional 3 hour hold period upon completion of the feeds, the reactor was cooled and vented to atmospheric pressure. A coagulum-free latex was obtained having 41.4% solids, 53 dynes/cm. surface tension and a pH of 1.3. The latex showed excellent stability after two freeze-thaw cycles. The recovered interpolymer had a composition equal to 81.8% vinyl chloride, 15% ethylene and 3.2% crotonic acid.

EXAMPLE 8

An autoclave was charged with 4,500 ml. of distilled water; 175 grams of a seed latex made by a procedure and composition substantially the same as in Example 3 and containing 33.7% solids; 35 grams of sodium persulfate and 1,200 grams of vinyl chloride monomer. The temperature was raised and ethylene gas was introduced to the reactor so as to have 1,200 p.s.i. ethylene pressure at 63° C. Two simultaneous feeds to the reactor were begun and continued over a 13 hour period maintaining said temperature and pressure. Feed 1 consisted of 4,570 grams of vinyl chloride monomer and Feed 2 of 1,200 g. of a 10% solution of monomethyl itaconate in water. After an additional 3 hour hold period the reactor was cooled and subsequently vented to atmospheric pressure. A coagulum-free latex was obtained having 45.8% solids, 51 dynes/cm. surface tension and pH of 1.4. The interpolymer composition was 86.5% vinyl chloride, 11% ethylene and 2.5% monomethyl itaconate. No evidence of instability was observed upon inspection of the latex one year after manufacture. The latex was twice frozen and thawed; neither grit formation nor change in viscosity was observed.

EXAMPLE 9

To an autoclave was charged 5500 ml. of distilled water, 175 grams of a seed latex using a procedure and composition similar to that of Example 3 and containing 33.7% solids, 35 grams of sodium persulfate and 1200 grams of vinyl chloride monomer. The temperature was raised and ethylene gas was introduced to the reactor so as to have 1200 p.s.i. ethylene pressure at 63° C. A feed to the reactor of 3,800 grams vinyl chloride monomer was begun and maintained over a 13-hour period during which time 390 grams of a 25% solution of monoethyl maleate was added incrementally in equal portions to the reactor. After an additional three-hour hold period the reactor was cooled and subsequently vented to atmospheric pressure. A latex was obtained with 42.4% solids, 58 dynes/cm. surface tension and a pH equal to 2.8. The composition of the interpolymer was 86.5% vinyl chloride, 16% ethylene and 2.2% monoethyl maleate. The shelf stability of the latex was good for at least more than one year.

EXAMPLE 10

A reactor was charged with 4,500 g. of deionized water, 152 g. of a 2-ethylhexyl acrylate seed latex containing 39.5% solids, 6 g. of sodium persulfate, 720 g. of vinyl chloride and 480 g. of vinyl acetate. The temperature was raised and ethylene was introduced to the autoclave so as to have 500 p.s.i. pressure at 80° C. Three simultaneous feeds to the reactor were begun and continued for 13 hours maintaining the aforementioned temperature and pressure. Feed 1 consisted of a mixture of 2880 g. of vinyl chloride and 1920 g. of vinyl acetate, Feed 2 of 1000 g. of a 3% solution of sodium persulfate in water and Feed 3 of 1200 g. of a 5% solution of acrylic acid in water. After an additional 3 hours of reaction, the autoclave was cooled and subsequently vented to atmospheric pressure. A coagulum-free latex was obtained with 43.7% solids and a surface tension of 45 dyne/cm. The interpolymer contained 1.1% copolymerized acrylic acid. The latex passed two freeze-thaw cycles without change in viscosity. It was a good adhesive for vinyl-to-vinyl, vinyl-to-iron and vinyl-to-aluminum.

EXAMPLE 11

A series of nine preparations is carried out in which the procedure of Example 4 is repeated with the same amounts of materials except that instead of acrylic acid, there is successively used methacrylic acid, monoisobutyl maleate, monocyclohexyl maleate, monomethyl aconitate, monodecyl fumarate, isobutyl itaconate, mono-octyl maleate, a 1:3 mixture of acrylic acid and monomethyl maleate and a 1:1 mixture of crotonic acid and monoethyl fumarate. In each case a freeze-thaw stable latex is obtained and vapor pressure chromatography demonstrates that the weight percent of caroxylated comonomer interpolymerized in the vinyl chloride/ethylene interpolymer is between about 1.5 and 2.5%.

EXAMPLE 12

A series of fifteen preparations is carried out using the procedure and materials of Example 5 except that the concentration of the acrylic acid solution is 10% and the seed latexes are successively chosen from latexes prepared as in Examples 1, 2 and 3, respectively. With each such latex five preparations are made using the seed latex in amounts corresponding respectively to 0.01%, 0.1%, 1.0%, 2.0% and 10% based on the weight of the aqueous composition. In each case, a free-thaw stable latex is obtained and vapor-phase chromatography demonstrates that the weight percent of carboxylated comonomer interpolymerized in the vinyl chloride/ethylene interpolymer is between about 1.7 and 2.1%.

EXAMPLE 13

The procedure and materials of Example 5 are used in a series of eleven preparations except that the seed latex in successive preparations is a latex of respectively, a polymer of methyl acrylate, a polymer of ethyl acrylate, a polymer of butyl acrylate, a polymer of isopropyl methacrylate, a polymer of vinylidene chloride, a polymer of vinyl propionate, a 1:1 copolymer of ethyl acrylate and methyl acrylate, a 1:3 copolymer of vinyl acetate and methyl acrylate, a 1:9 copolymer of decyl methacrylate and methyl acrylate, a 9:1 copolymer of vinyl chloride and ethylene and a 8.5: 1:0.5 interpolymer of vinyl chloride, ethylene and acrylic acid. The average particle size of each of the seeds is between about 0.005 and 0.10 microns. In each case a product latex is obtained which is stable to freezing and thawing. The ethylene content of the recovered polymer is between about 16 and 20% and the interpolymerized acrylic acid is determined by vapor phase chromatography of residual unreacted monomer, to be between about 0.8 and 1.1%.

It will be understood that it is intended to cover all changes and modifications of the examples of the invention herein chosen for the purpose of illustration which do not constitute departures from the spirit and scope of the invention.

What is claimed is:

1. A method of preparing a freeze-thaw stable latex of polymeric material containing at least 90% by weight of a vinyl chloride/ethylene interpolymer containing polymerized therein between about 6% and 30% ethylene and between about 0.5% and 10% of a carboxylated comonomer, which method comprises adding ethylene to and (a) maintaining ethylene pressure on an aqueous composition having a pH between about 0.5 and 5.0 and containing
  (i) between about 0.01% and 10%, by weight of said aqueous composition, of a seed latex polymer containing polymerized therein in the presence of an anionic or nonionic surfactant in amount corresponding to from 0.04% to about 5% based on seed latex monomers, monomers selected from the group consisting of $C_2$–$C_6$ alpha-olefins, vinyl halides, vinylidene halides, vinyl esters of $C_1$–$C_4$ carboxylic acids and $C_1$–$C_{10}$ alkyl esters of acrylic and methacrylic acids, and
  (ii) a free-radical initiating system maintained at a level sufficient to effect polymerization while
(b) adding gradually over a period of not less than six hours, a charge (A) of comonomer comprising at least 51% by weight of vinyl chloride and a charge (B) of a carboxylated comonomer selected singly or in combination from the group consisting of acrylic acid, methacrylic acid, crotonic acid and the monoesters of maleic, fumaric, itaconic and aconitic acid with alcohols having from one to ten carbon atoms, said charge (B) being in amount between about 0.5 and 10% of the total weight of charges (A) and (B) and
(c) maintaining the polymerization until a desired solids content is obtained.

2. The method of claim 1 wherein an amount of the comonomer charge (A) corresponding to between 1% and 25% of the weight of the emulsifying composition is initially added to said composition and wherein the remainder of comonomer charge (A) is then gradually and simultaneously added with charge (B).

3. The method of claim 1 wherein all of the comonomer charges (A) and (B) are both added gradually and simultaneously.

4. The method of claim 1 wherein charge (A) consists of vinyl chloride.

5. The method of claim 1 wherein charge (A) contains between 1% and 49% by weight of a supplemental coreactive comonomer selected singly or in combination from the group consisting of $C_1$–$C_6$ alpha-olefins, vinyl halides, vinylidene halides, vinyl esters of $C_1$–$C_4$ carboxylic acids and $C_1$–$C_{10}$ alkyl esters of acrylic and methacrylic acids.

6. The method of claim 5 wherein the supplemental comonomer is vinyl acetate.

7. A method of preparing a freeze-thaw stable latex of polymeric material containing at least 90% by weight of a vinyl chloride/ethylene/acrylic acid interpolymer, said method comprising the steps of (a) maintaining substantially constant ethylene pressure at a level between about 500 and 3,000 p.s.i. on an aqueous composition at a temperature between about 50° C. and 85° C., said composition having a pH between about 0.5 and 5.0, said composition also containing between about 0.01% and 10% of latex seed solids whose composition is selected from polyvinyl chloride, polyvinyl acetate and poly (2-ethylhexyl acrylate), and an amount of an anionic or nonionic surfactant corresponding to .04%–5% of the weight of said latex seed solids,
(b) adding gradually thereto over a period of not less than six hours an aqueous solution of a persulfate or peroxydiphosphate initiator, to effect polymerization while
(c) simultaneously adding at a substantially constant rate over the same period, amounts of acrylic acid and vinyl chloride in a weight ratio between about 0.6/100 and 5.3/100, (d) maintaining the polymerizing system at 50° C.–85° C. until a solids content of between about 42% and 55% is obtained, and (e) cooling to room temperature and releasing the pressure.

8. A method of preparing a freeze-thaw stable latex of an interpolymer, 100% of which interpolymer has the weight composition 93.5–60% vinyl chloride, 6–30% ethylene and 0.5–10% carboxylated monomer, which method comprises (a) preparing a seed latex by emulsion polymerization of monomers selected singly or in combination from the group consisting of $C_2$–$C_6$ alpha-olefins, vinyl halides, vinylidene halide, vinyl esters of $C_1$–$C_4$ carboxylic acids and $C_1$–$C_{10}$ alkyl esters of acrylic and methacrylic acids, in the presence of from 0.04% to about 5% based on seed latex monomers, of an anionic or nonionic surfactant, (b) maintaining ethylene pressure on an aqueous composition having a pH between about 0.5 and 5.0 and containing (i) sufficient of said seed latex to provide an amount of seed latex polymer corresponding to between about 0.01% and 10% by weight of said aqueous composition, (ii) a free-radical initiating system maintained at a level sufficient to effect polymerization while (iii) adding gradually over a period of not less than six hours, a charge (A) of comonomer comprising at least 51% by weight of vinyl chloride and a charge (B) of a carboxylated comonomer selected singly or in combination from the group consisting of acrylic acid, methacrylic acid, crotonic acid and the monoesters of maleic, fumaric, itaconic and aconitic acid with alcohols having from one to ten carbon atoms, said charge (B) being in amount between about 0.5 and 10% of the total weight of charges (A) and (B) and (c) maintaining the polymerization until a desired solids content is obtained.

9. A freeze-thaw stable latex having between about 42% and 55% solids, said solids consisting essentially of polymeric material whose composition is at least about 90% of a vinyl chloride/ethylene/acrylic acid interpolymer and, correspondingly to make 100%, between about 0.01% and 10% of a seed latex polymer selected from polyvinyl chloride, polyvinyl acetate and poly (2-ethylhexyl acrylate), said interpolymer having a weight composition of 93.5%–60% vinyl chloride, 6%–30% ethylene and 0.5%–10% acrylic acid, said freeze-thaw stable latex containing also an anionic or nonionic surfactant in amount corresponding to 0.04%–5% of the weight of said seed latex polymer.

10. A freeze-thaw stable latex having between about 42% and 55% solids, said solids consisting essentially of polymeric material whose composition is at least 90% of an interpolymer of vinyl chloride, ethylene and a carboxylated comonomer, the remainder of polymeric material to make 100% being a seed latex polymer containing polymerized therein monomers selected from the group consisting of $C_2$–$C_6$ alpha-olefins, vinyl halides, vinylidene halides, vinyl esters of $C_1$–$C_4$ carboxylic acids and $C_1$–$C_{10}$ alkyl esters of acrylic and methacrylic acids, said freeze-thaw stable latex containing also an anionic or nonionic surfactant in amount corresponding to 0.04%–5% of the weight of said seed latex monomer, said interpolymer having a weight composition of 93.5–60% vinyl chloride, 6–30% ethylene and 0.5–10% carboxylated monomer, said carboxylated monomer being selected singly or in combination from the group consisting of acrylic acid, methacrylic acid, crotonic acid and the monoesters of maleic, fumaric, itaconic and aconitic acids with alcohols having from one to ten carbon atoms.

References Cited
UNITED STATES PATENTS

| | | | |
|---|---|---|---|
| 3,177,172 | 4/1965 | Adams | 260—29.6 RW |
| 3,271,373 | 9/1966 | Wolff | 260—29.6 TA |
| 3,297,618 | 1/1967 | Glabisch et al. | 260—29.6 TA |
| 3,389,109 | 6/1968 | Harmon et al. | 260—29.6 TA |
| 3,522,200 | 7/1970 | Hardt et al. | 260—29.6 RB |

HAROLD D. ANDERSON, Primary Examiner

L. M. PHYNES, Assistant Examiner

U.S. Cl. X.R.

117—132 C, 161 UT; 260—29.6 RB, 29.6 TA, 78.5 BB